(12) United States Patent
Lobo et al.

(10) Patent No.: US 7,141,349 B2
(45) Date of Patent: Nov. 28, 2006

(54) METAL OXIDE COATING

(75) Inventors: Rukmini B. Lobo, Rochester, NY (US); Bradley K. Coltrain, Fairport, NY (US); Richard C. Van Hanehem, Hamiton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/963,295

(22) Filed: Oct. 12, 2004

(65) Prior Publication Data

US 2006/0079400 A1 Apr. 13, 2006

(51) Int. Cl.
*B41M 5/035* (2006.01)
*B41M 5/38* (2006.01)
*G03C 8/52* (2006.01)
*B05D 5/12* (2006.01)
*B05D 1/36* (2006.01)

(52) U.S. Cl. ........... 430/201; 427/126.3; 427/126.4; 427/126.5; 427/126.6; 427/146; 427/419.2; 427/419.5; 428/32.8; 428/32.81; 503/227

(58) Field of Classification Search .......... 427/146, 427/126.3, 126.4, 126.5, 126.6, 419.2, 419.5; 430/201; 503/227; 428/32.8, 32.81
See application file for complete search history.

(56) References Cited

U.S. PATENT DOCUMENTS

| | | | |
|---|---|---|---|
| 2,768,909 A | * | 10/1956 | Haslam .............. 428/336 |
| 4,166,876 A | * | 9/1979 | Chiba et al. .............. 428/215 |
| 4,737,486 A | | 4/1988 | Henzel |
| 4,929,592 A | | 5/1990 | Kanto et al. |
| 4,933,315 A | | 6/1990 | Kanto et al. |
| 5,122,501 A | * | 6/1992 | Bauer et al. .............. 503/227 |
| 5,288,691 A | | 2/1994 | Vanier et al. |
| 5,322,833 A | | 6/1994 | Defieuw et al. |
| 5,350,732 A | * | 9/1994 | Kosydar et al. ........... 503/227 |
| 5,514,822 A | * | 5/1996 | Scott et al. .................. 556/28 |
| 5,589,433 A | * | 12/1996 | Morrison et al. .......... 503/227 |
| 5,670,206 A | * | 9/1997 | Taoda et al. ............... 427/106 |

FOREIGN PATENT DOCUMENTS

EP  0 622 429  11/1994

OTHER PUBLICATIONS

DuPont, "DuPont Tyzor Organic Titanates, General Brochure", 2001, pp. 1-11.
U.S. Appl. No. 10/765,555, filed Jan. 27, 2004, Kenneth Ruschak et al, "Gravure Method and Apparatus for coating a Liquid Reactive to the Atmosphere".

* cited by examiner

*Primary Examiner*—Richard L. Schilling
(74) *Attorney, Agent, or Firm*—Kathleen Neuner Manne; Lynne M. Blank

(57) ABSTRACT

A metal oxide coating and a method of forming the metal oxide coating are disclosed, wherein the metal oxide coating composition includes a metal oxide precursor of the metal oxide, the metal oxide, or a combination thereof, and a solvent of secondary or tertiary $C_4$–$C_8$ alcohol.

18 Claims, No Drawings

METAL OXIDE COATING

FIELD OF THE INVENTION

An metal oxide coating and method of forming the same are described.

BACKGROUND OF THE INVENTION

Thermal transfer systems have been developed to obtain prints from pictures that have been generated electronically, for example, from a color video camera or digital camera. An electronic picture can be subjected to color separation by color filters. The respective color-separated images can be converted into electrical signals. These signals can be operated on to produce cyan, magenta, and yellow electrical signals. These signals can be transmitted to a thermal printer. To obtain a print, a black, cyan, magenta, or yellow dye-donor layer, for example, can be placed face-to-face with a dye image-receiving layer of a receiver element to form a print assembly which can be inserted between a thermal print head and a platen roller. A thermal print head can be used to apply heat from the back of the dye-donor sheet. The thermal print head can be heated up sequentially in response to the black, cyan, magenta, or yellow signals. The process can be repeated as needed to print all colors. A color hard copy corresponding to the original picture can be obtained. Further details of this process and an apparatus for carrying it out are contained in U.S. Pat. No. 4,621,271 to Brownstein.

To promote adhesion of the dye-donor layer to a substrate, an adhesion layer, called a subbing layer, can be used. The subbing layer can be polymeric, as known in the art, and can include an organic titanate or zirconate. Examples of such subbing layers are set forth in U.S. Pat. Nos. 4,929,592 and 4,737,486.

The subbing layer composition used with any specific substrate and dye-donor layer combination can provide various desirable characteristics. For example, the characteristics can include one or more of providing adhesion between the substrate and dye-donor layer, being easily coatable, having good stability over time, and not impacting, or impacting favorably, the resultant colors of the dye-donor patches upon transfer to a receiver.

It is known that organic titanates or zirconates form highly reactive and volatile compositions of low viscosity, making coating difficult. Further, organic titanates or zirconates are known to undergo hydrolysis to form an inorganic polymer of high molecular weight, and an alcohol byproduct. This results in a formulation that is extremely reactive with water, which can be undesirable in a recirculating coating situation. Further, the organic titanate formulations known in the art can readily accept dye, thereby reducing the amount of dye in the dye-donor layer for transfer. See, for example, U.S. Pat. No. 4,933,315.

One method of addressing the above problems in forming a layer including organic titanates or zirconates is to form a shroud of inert atmosphere in the coating area, and control the rate of reaction within the shrouded area. For example, this process is described in co-pending application U.S. Ser. No. 10/765,555 filed Jan. 27, 2004 by Ruschak et al. This requires additional equipment, process controls, and materials, increasing costs. Further, the process is prone to failure if processing conditions are not strictly controlled, and can lead to other defects in the product.

It would be desirable to provide a subbing layer for dye-donor elements used in thermal dye transfer which would provide superior adhesion between a polymeric support and a dye layer comprising a dye dispersed in a binder. It is further desirable to formulate a subbing layer coating composition including metal oxides precursors, wherein the subbing layer coating composition has controlled reactivity with water, good stability over time, and good coatability, and the dry composition has good stability over time, good adhesion properties, and has little or a favorable impact on dye characteristics of a dye-donor layer. It is also desirable to formulate a coating composition and method for forming a metal oxide coating that does not require additional equipment and reduces waste.

SUMMARY OF THE INVENTION

A method of forming a coating layer comprising a metal oxide is disclosed, the method comprising forming a coating composition comprising a metal oxide precursor of the metal oxide, the metal oxide, or a combination thereof, and a solvent of secondary or tertiary $C_4$–$C_8$ alcohol; and coating the composition in an uncontrolled environment to form a layer comprising the metal oxide.

ADVANTAGES

A metal oxide coating layer including a metal oxide is disclosed wherein the metal oxide coating composition has controlled reactivity with water, good stability over time, and good coatability, and the dry composition has good stability over time, good adhesion properties, little or a favorable impact on dye characteristics of a dye-donor layer, or a combination thereof. Further, during manufacturing, no additional equipment, specialized process controls, or verification steps are required, and no environmental controls are required, thereby lowering costs of manufacture, and eliminating waste caused by possible defects in the metal oxide coating layer or products including such a coating layer.

DETAILED DESCRIPTION OF THE INVENTION

Metal oxide coatings can be useful in various areas. For example, a metal oxide coating can be used as a subbing layer in a thermal dye-donor element as an adhesive layer, a barrier layer, an antistat layer, or a combination thereof. Metal oxide coatings can also be used in the manufacture of other products, for example, displays, semiconductors, and metallic surfaces, or in printing. Metal oxide coatings, and methods of forming them, are described with reference to use in a dye-donor element.

A dye-donor element can include a dye-donor layer. The dye-donor layer can include one or more colored areas (patches) containing dyes suitable for thermal printing. As used herein, a "dye" can be one or more dye, pigment, colorant, or a combination thereof, and can optionally be in a binder or carrier as known to practitioners in the art. During thermal printing, at least a portion of one or more colored areas can be transferred to the receiver element, forming a colored image on the receiver element. The dye-donor layer can include a laminate area (patch) having no dye. The laminate area can follow one or more colored areas. During thermal printing, the entire laminate area can be transferred to the receiver element. The dye-donor layer can include one or more colored areas and one or more laminate areas. For example, the dye-donor layer can include three color patches, for example, yellow, magenta, and cyan, and a clear laminate patch, for forming a three color image with a protective laminate layer on a receiver element.

Any dye transferable by heat can be used in the dye-donor layer of the dye-donor element. For example, sublimable dyes can be used, such as but not limited to anthraquinone dyes, such as Sumikalon Violet RS® (product of Sumitomo Chemical Co., Ltd.), Dianix Fast Violet 3R-FS® (product of Mitsubishi Chemical Corporation.), and Kayalon Polyol Brilliant Blue N-BGM® and KST Black 146® (products of Nippon Kayaku Co., Ltd.); azo dyes such as Kayalon Polyol Brilliant Blue BM®, Kayalon Polyol Dark Blue 2BM®, and KST Black KR® (products of Nippon Kayaku Co., Ltd.), Sumickaron Diazo Black 5G® (product of Sumitomo Chemical Co., Ltd.), and Miktazol Black 5GH® (product of Mitsui Toatsu Chemicals, Inc.); direct dyes such as Direct Dark Green B® (product of Mitsubishi Chemical Corporation) and Direct Brown M® and Direct Fast Black D® (products of Nippon Kayaku Co. Ltd.); acid dyes such as Kayanol Milling Cyanine 5R® (product of Nippon Kayaku Co. Ltd.); and basic dyes such as Sumicacryl Blue 6G® (product of Sumitomo Chemical Co., Ltd.), and Aizen Malachite Green® (product of Hodogaya Chemical Co., Ltd.); magenta dyes of the structures

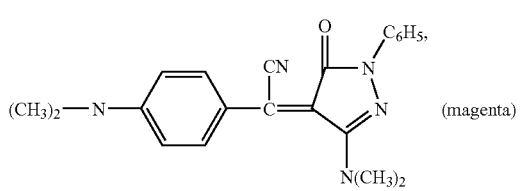

(magenta)

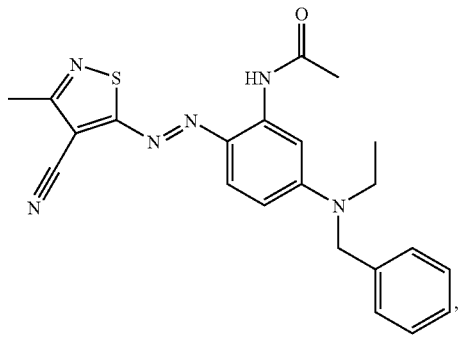

,

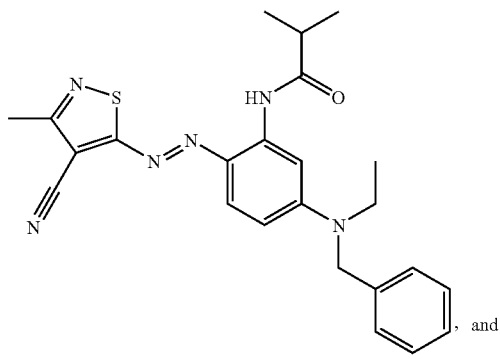

, and

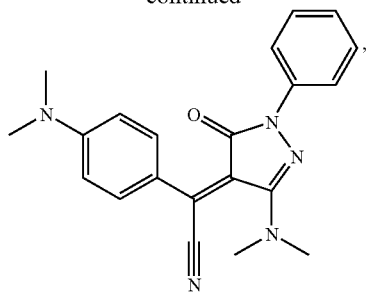

, and cyan dyes of the structures

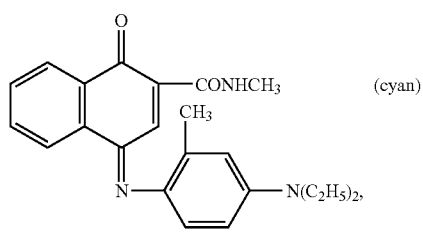

(cyan)

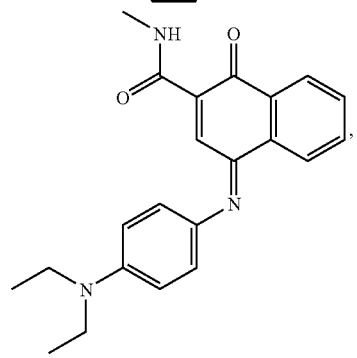

,

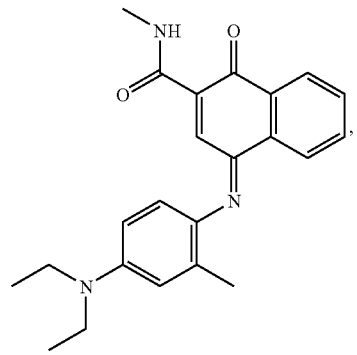

,

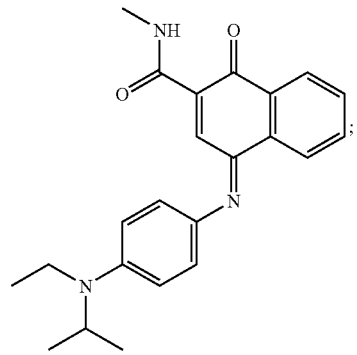

;

-continued

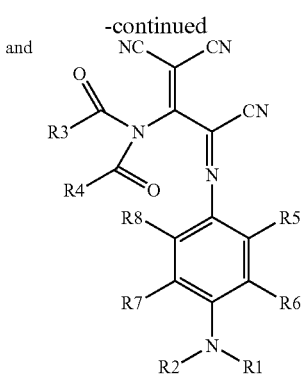
and wherein R1 and R2 each independently represents an alkyl group, a cycloalkyl group, an aryl group, or a heterocyclic group; R1 and R2 together represent the necessary atoms to close a heterocyclic ring; or R1 and/or R2 together with R6 and/or R7 represent the necessary atoms to close a heterocyclic ring fused on the benzene ring;

R3 and R4 each independently represents an alkyl group, or an alkoxy group;

R5, R6, R7 and R8 each independently represents hydrogen, an alkyl group, a cycloalkyl group, an aryl group, an alkoxy group, an aryloxy group, a carbonamido group, a sulfamido group, hydroxy, halogen, $NHSO_2R_9$, $NHCOR_9$, $OSO_2R_9$, or $OCOR_9$; or R5 and R6 together and/or R7 and R8 together represent the necessary atoms to close heterocyclic ring(s) fused on the benzene ring; or R6 and/or R7 together with R1 and/or R2 represent the necessary atoms to close a heterocyclic ring fused on the benzene ring; and R9 represents an alkyl group, a cycloalkyl group, an aryl group and a heterocyclic group;

and yellow dyes of the structures

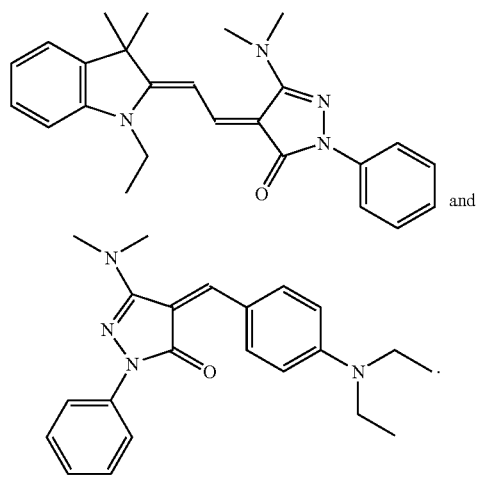

Other examples of dyes are set forth in U.S. Pat. No. 4,541,830, and are known to practitioners in the art. The dyes can be employed singly or in combination to obtain a monochrome dye-donor layer. The dyes can be used in an amount of from about 0.05 g/m² to about 1 g/m² of coverage. According to various embodiments, the dyes can be hydrophobic.

The dye-donor layer can have a dye to binder ratio for each color dye patch. For example, a yellow dye to binder ratio can be from about 0.3 to about 1.2, or from about 0.5 to about 1.0. A magenta dye to binder ratio can be from about 0.5 to about 1.5, or from about 0.8 to about 1.2. A cyan dye to binder ratio can be from about 1.0 to about 2.5, or from about 1.5 to about 2.0.

To form a dye-donor layer, one or more dyes can be dispersed in a polymeric binder, for example, a polycarbonate; a poly(styrene-co-acrylonitrile); a poly(sulfone); a poly(phenylene oxide); a cellulose derivative such as but not limited to cellulose acetate hydrogen phthalate, cellulose acetate, cellulose acetate propionate, cellulose acetate butyrate, or cellulose triacetate; or a combination thereof. The binder can be used in an amount of from about 0.05 g/m² to about 5 g/m².

The dye-donor layer of the dye-donor element can be formed or coated on a support. The dye-donor layer can be formed on the support by a printing technique such as but not limited to a gravure process, spin-coating, solvent-coating, extrusion coating, or other methods known to practitioners in the art.

The support can be formed of any material capable of withstanding the heat of thermal printing. According to various embodiments, the support can be dimensionally stable during printing. Suitable materials can include polyesters, for example, poly(ethylene terephthalate); polyamides; polycarbonates; glassine paper; condenser paper; cellulose esters, for example, cellulose acetate; fluorine polymers, for example, polyvinylidene fluoride, and poly(tetrafluoroethylene-cohexafluoropropylene); polyethers, for example, polyoxymethylene; polyacetals; polyolefins, for example, polystyrene, polyethylene, polypropylene, and methylpentane polymers; polyimides, for example, polyimide-amides and polyether-imides; and combinations thereof. The support can have a thickness of from about 2 µm to about 30 µm, for example, from about 3 µm to about 7 µm.

According to various embodiments, a metal oxide subbing layer, for example, an adhesive or tie layer, a dye-barrier layer, or a combination thereof, can be coated between the support and the dye-donor layer. The subbing layer can adhere the dye-donor layer to the support. The subbing layer coating composition can be prepared from metal oxide precursors or metal oxides, and a solvent. Metal oxide precursors can include one or more hydrolyzable monomer of the general formula $MX_4$ wherein X is hydrogen, halogen, alkoxy, aryloxy, carboxy, or an $-NR_2$ group, in which R is hydrogen and/or alkyl, and/or aryl with the proviso that not all of X are hydrogen, and M is a metal.

Suitable metal oxides can include one or more of the following metals: titanium, zirconium, boron, aluminum, tin, germanium, indium, gallium, hafnium, silicon, vanadium, tantalum, lead, lanthanum, iron, copper, yttrium, barium, and magnesium. Other metals capable of forming a continuous metal oxide coating layer can also be used, wherein a continuous coating is a coating with properties sufficient to prevent dye migration between materials on either side of the coating layer. This can be achieved, for example, by a coating with contiguous coverage, sufficient thickness, sufficient density, or a combination thereof. According to various embodiments, the metals can be selected from titanium, zirconium, boron, aluminum, tin, germanium, indium, gallium, hafnium, silicon, vanadium, tantalum and mixtures thereof. In particular, metal oxides including at least a portion of titanium or zirconium are preferred. For example, organic titanates can be used such as but not limited to triethanolamine titanate; tetrakis(2-ethylhexyl)titanate; isopropyl triisostearoyl titanate; titanium alkoxides, such as titanium tetra-isopropoxide or titanium tetra-n-butoxide; or combinations thereof. Similar compounds of zirconium or other metals can be used.

One or more metal oxide precursors can be present in the metal oxide coating composition in a concentration of 0.1 to 30% by weight, for example, 8–15% by weight, with a solvent. Depending on the coating method selected and the desired laydown of the resultant metal oxide, the amount of metal oxide precursors in the composition can be greater or less. For example, undiluted forms of metal oxides precursors can be used. The coated metal oxide can be in an amount of 10 $mg/m^2$ to 1000 $mg/m^2$, for example 100 $mg/m^2$ to 500 $mg/m^2$, or 15 $mg/m^2$ to 300 $mg/m^2$. The amount of coated metal oxide can be less or more as needed to achieve the desired effects. The metal oxide subbing layer can provide beneficial antistatic properties.

It is known that metal oxide precursors, such as organic titanates or zirconates, react with water to form metal oxide networks. For example, it has been taught by E.I Dupont de Nemours ("Dupont") in its literature for Tyzor®, a brand of organic titanates and zirconates, that the rate of hydrolysis of the organic titanate or zirconate can depend on the size and complexity of one or more alkyl groups in the structure of the organic titanate or zirconate, and the presence of alcohols in a solvent for the organic titanate or zirconate, wherein the alcohols can retard the hydrolysis and polymerization of the organic titanate or zirconate. The desired product of the hydrolysis of the organic titanate is a titanium oxide containing layer, and the product of the hydrolysis of the organic zirconate is a zirconium oxide containing layer, wherein these layers can contain mixed metal oxide products.

As known to those skilled in the art of solvent coating, the choice of solvents and any co-solvents can be affected by the ability of the solvent to dissolve the solute, the volatility of the solvent under coating or drying conditions of manufacture, and the effects of any residual solvent on the product. For example, in a dye-donor element, residual solvent can cause unwanted adhesion effects between the dye-donor layer and the receiver; a shift in sensitometric readings of the transferred dye layer, for example, color density or hue; negative effects on friction characteristics of the slipping layer in the printer; and failure of barrier layer functionality, such that the dye is capable of migrating from the dye donor layer into other layers, such as the support.

The literature has taught the use of alcohols as solvents for organic titanates and zirconates, for example, the use of n-butyl alcohol (butanol), ethanol, and isopropanol. Other suggested solvents include propyl acetate, benzene, toluene, xylene, n-hexane, chloroform, methyl chloroform, carbon tetrachloride, or combinations of any of the above solvents. See, for example, U.S. Pat. Nos. 5,288,691, 4,929,592, and 4,737,486, and the Dupont® Tyzor® Organic Titanate General Brochure. Low molecular weight alcohols are taught as favorable because they have lower boiling points and are easier to remove from the resulting composition.

Organic titanates or zirconates are suggested for use in a back coating on a thermal dye-donor layer in U.S. Pat. No. 5,322,833, and are solvated with alcohols such as isopropanol or 1-butanol to control hydrolysis of the organic titanate or zirconate. The references cited herein typically teach or exemplify the use of 1-butanol or isopropanol as a solvent for an organic titanate or zirconate.

It has been found that manufacture and coating of metal oxide subbing layers containing organic titanate or zirconate as described in the art, or other metal oxides, using a primary alcohol or other solvent as described above, results in a subbing layer composition that is often unusable in manufacture due to instability of the coating solution. The composition can demonstrate poor adhesion properties, leading to donor/receiver sticking in use forming thermal prints. The use of known solvents can result in a metal oxide coating layer that is tacky, has poor barrier properties, and results in poor product stability.

Use of known solvents as described above herein can lower the viscosity of the metal oxide subbing layer coating composition, causing bleeding into adjacent areas, for example, when patch coated, and puddling of the coated layer. Further, the low viscosity can cause turbulent flow of the coating materials, resulting in poor fluid control while wetting, and excessive splashing during coating, resulting in errors in coating application and wasted coated materials.

It has unexpectedly been found that the use of one or more secondary or tertiary $C_4$–$C_8$ alcohol in the coating composition eliminates the afore-said problems associated with metal oxide subbing layer compositions. For example, the use of a secondary or tertiary $C_4$–$C_8$ alcohol, such as sec-butanol, as a solvent or co-solvent results in a metal oxide subbing layer coating composition that has good reactivity, good coatability, and good coating solution stability over time. The resulting dry metal oxide subbing layer coating has good adhesion properties, and has little or a favorable impact on the dye characteristics of the dye-donor layer. "Stability" as used herein refers to the ability of a solution to not evidence a precipitate for a period sufficient to allow coating of the solution, for example, at least 20 minutes, at least six hours, at least 24 hours, or longer as needed. Secondary or tertiary $C_4$–$C_8$ alcohols can provide a balance of reaction time and solution stability. Secondary or tertiary $C_4$–$C_8$ alcohols can control hydrolysis and condensation reactions, providing longer stability while maintaining a relatively low boiling point and good solvent volatility.

One or more secondary or tertiary $C_4$–$C_8$ alcohol can be used as a solvent or a co-solvent in any amount suitable to achieve the desired properties of the metal oxide subbing layer coating composition and/or subbing layer coating. For example, as a co-solvent, one or more secondary or tertiary $C_4$–$C_8$ alcohol can be present in an amount of at least 50%, at least 75%, at least 85%, or at least 90%. The amount of secondary or tertiary $C_4$–$C_8$ alcohol can be adjusted to achieve the desired properties, and can be less than 50% dependent on the properties of one or more co-solvents. Preferred secondary or tertiary $C_4$–$C_8$ alcohols include sec-butanol, tertiary butanol, sec-pentanol, neo-pentanol, and secondary hexanol.

A polymeric binder can be employed in the subbing layer of the dye-donor element. The polymeric binder can be soluble in organic solvents. The polymeric binder can be a water-soluble or hydrophilic resin. The resin can have a group reactive with the metal oxide precursor, for example, a hydroxyl group or carboxyl group. It is desirable that the binder not be subject to attack by any organic solvent used during formation of the dye layer on the subbing layer.

Specific examples of suitable binders can include homopolymers including unsaturated carboxylic acid such as acrylic acid, methacrylic acid, maleic acid, itaconic acid and the like; copolymers of these unsaturated carboxylic acids with another vinyl monomers, such as styrene-maleic acid copolymer, styrene-(meth)acrylic acid copolymer, (meth)acrylic acid-(meth)acrylic acid ester copolymer, and olefin-(meth)acrylic acid copolymer; vinyl alcohol type resins such as polyvinyl alcohol, partially saponified polyvinyl acetate, polyvinyl acetal, polyvinyl butyral, and vinyl alcohol-ethylene-(meth)acrylic acid copolymer; polyester resins modified to be insoluble or partially soluble in solvent during formation of the dye layer on the subbing layer; and modified polyamide resins. The binder can contain hydroxyl, amino, thio, amido, or carboxyl groups, or a combination thereof. Cellulosic binders can be used, for example, cellulose acetate, cellulose triacetate (fully acetylated), or a cellulose mixed ester such as cellulose acetate butyrate, cellulose acetate hydrogen phthalate, cellulose acetate formate, cellulose acetate propionate, cellulose acetate pentanoate, cellulose acetate hexanoate, cellulose acetate heptanoate, or cellulose acetate benzoate. The binders can be in any form of aqueous solution, organic solvent solution, aqueous dispersion or emulsion in water.

The polymeric binder in the dye-donor element of the invention can be present in any concentration which is effective for the intended purpose. In general, good results have been obtained with coatings containing from 0.05 to 5 g/m$^2$ of polymeric binder.

The metal oxide subbing layer coating composition can act as a barrier layer, preventing migration of a dye from the dye-donor layer formed on the subbing layer into the support, increasing dye transfer efficiency. The subbing layer coating composition can also improve the thermal conductivity of the dye-donor element, thereby improving dye transfer by increasing the amount of dye transfer, the speed of dye transfer, or a combination thereof. The subbing layer can function as an adhesive layer, for example, between the support and the dye-donor layer, preventing sticking of the dye-donor layer of the dye-donor element with the receiver element on printing, and between a slipping layer and the support.

The subbing layer can be coated by any known method, for example, curtain coating, roll coating, gravure coating, jet feed coating, knife or blade coating, or extrusion. The subbing layer can be formed separately and applied to, or can be formed on the support or an intervening layer. The subbing layer can be coated simultaneously with one or more other layers. The subbing layer can be patch coated. For example, the subbing layer can be coated by gravure coating, screen printing, ink jet printing, offset printing, or flexography. The subbing layer coating composition can have sufficient material property characteristics that it does not bleed into adjacent areas, form puddles, or exhibit excessive splashing during coating.

The subbing layer can be coated in an uncontrolled environment, wherein the humidity, temperature, atmospheric composition, air flow, or a combination thereof are not regulated. The subbing layer composition as described herein is particularly suitable for coating in uncontrolled humidity.

The dye-donor element can include a slip layer capable of preventing the print head from sticking to the dye-donor element. The slip layer can be coated on a side of the support opposite the dye-donor layer. The slip layer can include a lubricating material, for example, a surface-active agent, a liquid lubricant, a solid lubricant, or mixtures thereof, with or without a polymeric binder. Suitable lubricating materials can include oils or semi-crystalline organic solids that melt below 100° C., for example, poly(vinyl stearate), beeswax, perfluorinated alkyl ester polyether, poly(caprolactone), carbowax, polyethylene homopolymer, or poly(ethylene glycol). Suitable polymeric binders for the slip layer can include poly(vinyl alcohol-co-butyral), poly(vinyl alcohol-co-acetal), poly(styrene), poly(vinyl acetate), cellulose acetate butyrate, cellulose acetate, ethyl cellulose, and other binders as known to practitioners in the art. The amount of lubricating material used in the slip layer is dependent, at least in part, upon the type of lubricating material, but can be in the range of from about 0.001 to about 2 g/m$^2$, although less or more lubricating material can be used as needed. If a polymeric binder is used, the lubricating material can be present in a range of 0.1 to 50 weight %, preferably 0.5 to 40 weight %, of the polymeric binder.

The dye-donor element can include a stick preventative agent to reduce or eliminate sticking between the dye-donor element and the receiver element during printing. The stick preventative agent can be present in any layer of the dye-donor element, so long as the stick preventative agent is capable of diffusing through the layers of the dye-donor element to the dye-donor layer. For example, the stick preventative agent can be present in one or more patches of the dye-donor layer, in the support, in an adhesive layer, in a barrier layer, in the slip layer, in the subbing layer described herein, or in a combination thereof. According to various embodiments, the stick preventative agent can be in the slip layer and the dye-donor layer. According to various embodiments, the stick preventative agent is in the dye-donor layer. The stick preventative agent can be in one or more colored patches of the dye-donor layer, or a combination thereof. If more than one dye patch is present in the dye-donor layer, the stick preventative agent can be present in the last patch of the dye-donor layer to be printed, typically the cyan layer. However, the dye patches can be in any order. For example, if repeating patches of cyan, magenta, and yellow are used in the dye-donor element, in that respective order, the yellow patches, as the last patches printed in each series, can include the stick preventative agent.

The amount of stick preventative agent suitable for use in the dye-donor element depends on several factors, for example, the composition of the dye-donor element, the composition of the receiver element, the stick preventative agent used, and the print conditions, such as print speed and print head voltage. The stick preventative agent can be used in an amount of about 0.02 g/m$^2$ or less, about 0.01 g/m$^2$ or less, about 0.005 g/m$^2$ or less, from about 0.0001 g/m$^2$ to about 0.01 g/m$^2$, from about 0.0003 g/m$^2$ to about 0.0015 g/m$^2$, or from about 0.0005 g/m$^2$ to about 0.001 g/m$^2$. More or less stick preventative agent can be used as needed to prevent donor-receiver sticking. If too much stick preventative agent is used, a reduction in film strength, a decrease in dye transfer properties, a discoloration of dye, reduced staying or stability of dyes, or a combination thereof can occur. If too little stick preventative agent is used, no improvement in stick prevention can be seen.

The stick preventative agent can be a silicone- or siloxane-containing polymer. Suitable polymers can include graft co-polymers, block polymers, co-polymers, and polymer blends or mixtures. Suitable stick preventative agents can be used to prevent sticking of the dye-donor element and receiver element at high print speeds, for example, less than 4.0 ms/line, 2.0 ms/line or less, 1.5 ms/line or less, 1.0 ms/line or less, or 0.5 ms/line or less. Suitable stick preventative agents can also be used to prevent sticking at higher print head voltages, for example, voltages of 10 or more, or 20 or more. Suitable stick preventative agents can include those that provide a defect-free image on the receiver element, wherein the image has a density of at least two, while printing at high print speeds. Other suitable stick preventative agents can include those having a print to fail value of at least four while printing at high speeds.

Optionally, release agents as known to practitioners in the art can also be added to the dye-donor element, for example, to the dye-donor layer, the slip layer, or both. Suitable release agents include those described in U.S. Pat. Nos. 4,740,496 and 5,763,358.

Additional adhesive layers can be present, for example, between the subbing layer and the support, between the subbing layer and the dye-donor layer, or between the slip layer and the support.

A thermally conductive layer can be present in the dye-donor element. Thermally conductive materials can be present in a layer of the dye-donor element to form a thermally conductive layer. For example, thermally conductive particles can be present in the subbing layer, the dye-donor layer, the support, or a combination thereof. The metal oxide subbing layer can be a thermally conductive layer, or can be used in addition to a thermally conductive layer.

The dye-donor element can be a sheet of one or more colored patches or laminate, or a continuous roll or ribbon. The continuous roll or ribbon can include one patch of a monochromatic color or laminate, or can have alternating areas of different patches, for example, one or more dye patches of cyan, magenta, yellow, or black, one or more laminate patches, or a combination thereof.

The receiver element suitable for use with the dye-donor element described herein can be any receiver element as known to practitioners in the art. For example, the receiver element can include a support having thereon a dye image-receiving layer. The support can be a transparent film, for example, a poly(ether sulfone), a polyimide, a cellulose ester such as cellulose acetate, a poly(vinyl alcohol-co-acetal), or a poly(ethylene terephthalate). The support can be a reflective layer, for example, baryta-coated paper, white polyester (polyester with white pigment incorporated therein), an ivory paper, a condenser paper, or a synthetic paper, for example, Dupont Tyvek® by E.I. DuPont de Nemours and Company. The support can be employed at any desired thickness, for example, from about 10 μm to 1000 μm. Exemplary supports for the dye image-receiving layer are disclosed in commonly assigned U.S. Pat. Nos. 5,244,861 and 5,928,990, and in EP-A-0671281. Other suitable supports as known to practitioners in the art can also be used.

The dye image-receiving layer can be, for example, a polycarbonate, a polyurethane, a polyester, polyvinyl chloride, poly(styrene-co-acrylonitrile), poly(caprolactone), or combinations thereof. The dye image-receiving layer can be coated on the receiver element support in any amount effective for the intended purpose of receiving the dye from the dye-donor layer of the dye-donor element. For example, the dye image-receiving layer can be coated in an amount of from about 1 g/m² to about 5 g/m².

Additional polymeric layers can be present between the support and the dye image-receiving layer. For example, a polyolefin such as polyethylene or polypropylene can be present. White pigments such as but not limited to titanium dioxide, zinc oxide, and the like can be added to the polymeric layer to provide reflectivity. An adhesive or tie layer optionally can be used over the polymeric layer in order to improve adhesion to the dye image-receiving layer. This can be called a subbing layer. Exemplary adhesive layers are disclosed in U.S. Pat. Nos. 4,748,150, 4,965,238, 4,965,239, and 4,965241. An antistatic layer as known to practitioners in the art can also be used in the receiver element. The receiver element can also include a backing layer. Suitable examples of backing layers include those disclosed in U.S. Pat. Nos. 5,011,814 and 5,096,875.

The dye image-receiving layer, or an overcoat layer thereon, can contain a release agent, for example, a silicone or fluorine based compound, as is conventional in the art. Various exemplary release agents are disclosed, for example, in U.S. Pat. Nos. 4,820,687 and 4,695,286.

The receiver element can also include stick preventative agents as described for the dye-donor element. According to various embodiments, the receiver element and dye-donor element can include the same stick preventative agent.

The dye-donor element and receiver element, when placed in superimposed relationship such that the dye-donor layer of the dye-donor element is adjacent the dye image-receiving layer of the receiver element, can form a print assembly. An image can be formed by passing the print assembly past a print head, wherein the print head is located on the side of the dye-donor element opposite the receiver element. The print head can apply heat image-wise to the dye-donor element, causing the dyes in the dye-donor layer to transfer to the dye image-receiving layer of the receiver element.

Thermal printing heads which can be used to transfer dye from dye-donor elements to receiver elements are available commercially. Examples of suitable thermal print heads can include a Fujitsu Thermal Head (FTP-040 MCSOO1), a TDK Thermal Head F415 HH7-1089 or a Rohm Thermal Head KE 2008- F3.

A dye-donor element having a subbing layer coating composition including a metal oxide precursor in a solvent of secondary or tertiary $C_4$–$C_8$ alcohol, for example, sec-butanol, provides a composition that has controlled reactivity with water, good stability over time, and good coatability, and a dry composition having good stability over time, good adhesion properties, and little or a favorable impact on the dye characteristics of the dye-donor layer. The dye-donor element also shows reduced sticking as compared to like elements wherein the metal oxide subbing layer is prepared without a secondary or tertiary $C_4$–$C_8$ alcohol.

The following examples are provided to illustrate the advantages of the invention.

EXAMPLES

Experiment 1:

An experiment was run with a dye-donor element including a subbing layer of one of the following compositions 1–3 on a support of Mylar®. All subbing layer compositions had 11.45% solids. All subbing layer coatings were done at a coating speed of 182 m/min (600 fpm). A dye-donor element was prepared by coating a metal oxide subbing layer on one side of a support, drying the subbing layer, coating a second metal oxide subbing layer on a second side of the support, drying the second subbing layer, coating a dye-donor layer including a cyan dye on the subbing layer on one side of the support, drying the dye-donor layer, coating a slip layer on the second subbing layer on the side of the support opposite the dye-donor layer, and drying the slip layer. The subbing layer coating compositions were as follows:

1. Tyzor™ Tetra butyl titanate (TBT) in an 85:15 solvent mixture of n-Propyl Acetate and 1-butanol
2. TBT in solvent of 1-butanol
3. TBT in solvent of sec-butanol TBT and the Mylar® support were obtained from E.I. DuPont de Nemours, Wilmington, Del.

The dye donor layer included cyan dye #1 at 0.092 g/m², cyan dye #2 at 0.084 g/m², and cyan dye #3 at 0.21 g/m² (all dyes illustrated below), cellulose acetate propionate binder at 0.22 g/m², polyester sebacate (Paraplex G-25) at 0.015 g/m², and divinyl benzene beads at 0.008 g/m² coated from a 75% toluene, 20% methanol, and 5% cyclopentanone solvent mixture.

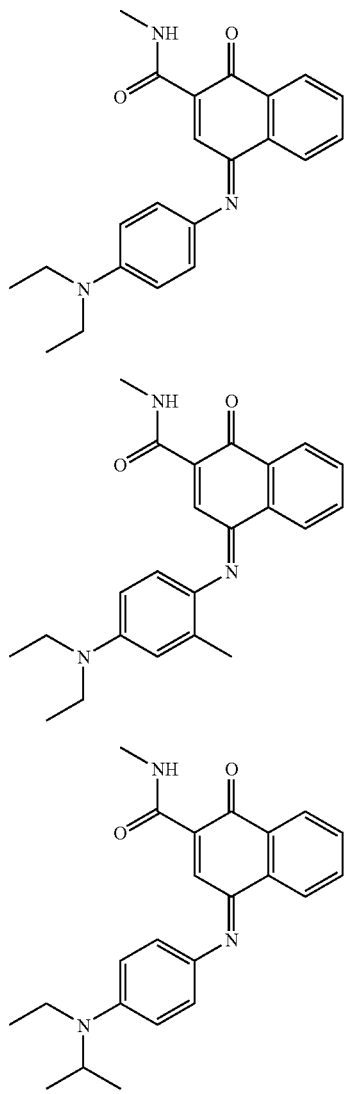

cyan dye # 1 cyan dye # 2 cyan dye # 3

Each subbing layer coating composition in a dye-donor element as described was tested for the following properties with the following results.

A. Barrier Properties:

The dye-donor elements were used to form an image on a receiver using a thermal printer. The used dye-donor elements were washed with a solvent rinse comprising toluene, methanol and cyclopentanone in a ratio of 70/25/5 by weight to determine if any dye was present in the support. All samples showed no dye in the support after washing.

B. Adhesion Properties:

The adhesion properties of the subbing layers were tested by tape adhesion test, where scotch tape was adhered to the dye layer of a dye-donor element and peeled at a ninety degree angle. Adhesion failure was seen in dye-donor elements having subbing layer compositions 1 and 2, with subbing layer composition 1 providing better adhesion than subbing layer composition 2. The dye-donor element having subbing layer composition 3 showed no failure.

C. Residual Solvents:

Each subbing layer was tested for residual solvents by gas chromatography after coating on the support. The following constructions were made as described above and tested:

1A. subbing layer 1 coated and dried on one side of the support 1B. subbing layer 1 coated and dried on both sides of the support 2A. subbing layer 2 coated and dried on one side of the support 2B. subbing layer 2 coated and dried on both sides of the support 3A. subbing layer 3 coated and dried on one side of the support 3B. subbing layer 3 coated and dried on both sides of the support The results are set forth in Table 1.

TABLE 1

| SUBBING LAYER | sec-BuOH (ug/m²) | 1-BuOH (ug/m²) | n-Propyl Acetate (ug/m²) | Total Residual Solvent (ug/m²) |
|---|---|---|---|---|
| 1A | — | 1467 | <93* | <1560 |
| 1B | — | 1913 | <93* | <2006 |
| 2A | — | 1570 | — | 1570 |
| 2B | — | 1830 | — | 1830 |
| 3A | 353 | 604 | — | 957 |
| 3B | 260 | 399 | — | 659 |

*This is the lowest detection limit of the gas chromatograph.

As can be seen from this experiment, sec-butanol performs better than 1-butanol, or a mixture of 1-butanol with n-propyl acetate, providing better adhesion properties and retaining less overall residual solvent.

Experiment 2

Subbing layer coating compositions 1–3 from Example 1 were prepared and tested for stability by observing the resultant composition for precipitate over time. The details and results are in Table 2. As can be seen from Table 2, sec-butanol showed the greatest stability with water levels less than 2% of the composition.

TABLE 2

| SUBBING LAYER | % WATER | TEST RESULTS |
|---|---|---|
| 1 | 2 | Precipitated at make-up |
| 1 | 1.5 | Precipitated at make-up |
| 1 | 1 | Precipitated at make-up |
| 2 | 2 | Precipitated at make-up |
| 2 | 1.5 | Precipitated at make-up |
| 2 | 1 | Precipitated after 1 week |
| 3 | 2 | Precipitated at make-up |
| 3 | 1.5 | Precipitated after 12 hrs |
| 3 | 1 | Still clear after 3 weeks |

This invention has been described in detail with particular reference to certain preferred embodiments thereof, but it will be understood that variations and modifications can be effected within the spirit and scope of the invention.

The invention claimed is:

1. A method of forming a dye-donor element comprising:
forming a support;
coating a composition in an uncontrolled environment, wherein the composition comprises a metal oxide precursor, metal oxide, or combination thereof and a solvent of secondary or tertiary $C_4$–$C_8$ alcohol on the support to form a subbing layer comprising a metal oxide, wherein the secondary or tertiary $C_4$–$C_8$ alcohol is present in an amount of at least 50% of the coating composition; and
forming a dye-donor layer comprising at least one dye over the subbing layer.

2. The method of claim 1, further comprising coating an adhesive layer on the support, on the subbing layer, or both.

3. The method of claim 1, wherein the coating composition comprises more than one metal oxide precursor, more than one metal oxide, or a combination thereof.

4. The method of claim 1, wherein the coating composition comprises a metal oxide and a metal oxide precursor.

5. The method of claim 3, wherein the metal oxide precursor is not a precursor to the metal oxide in the coating composition.

6. The method of claim 1, wherein the metal oxide precursor is selected from one or more hydrolysable monomer of a formula $MX_4$ wherein X is hydrogen, halogen, alkoxy, aryloxy, carboxy, or an —$NR_2$ group, in which R is selected from hydrogen, alkyl, and aryl, with the proviso that not all of X are hydrogen, and M is a metal.

7. The method of claim 1, wherein the metal oxide is one or more oxide of titanium, zirconium, boron, aluminum, tin, germanium, indium, gallium, hafnium, silicon, vanadium, or tantalum.

8. The method of claim 1, wherein the metal oxide is one or more oxide of titanium, zirconium, aluminum, tin, or silicon.

9. The method of claim 1, wherein the solvent comprises sec-butanol, tertiary butanol, sec-pentanol, neo-pentanol, secondary hexanol, or a combination thereof.

10. The method of claim 1, wherein the solvent comprises sec-butanol.

11. The method of claim 1, wherein the secondary or tertiary $C_4$–$C_8$ alcohol is present in an amount of at least 75% of the coating composition.

12. The method of claim 1, wherein the secondary or tertiary $C_4$–$C_8$ alcohol is present in an amount of at least 90% of the coating composition.

13. The method of claim 1, wherein the coating composition comprises a metal oxide precursor, metal oxide, or combination thereof in an amount of 0.1% to 30% by weight of the composition.

14. The method of claim 1, wherein the coating composition comprises a metal oxide precursor, metal oxide, or combination thereof in an amount of 8% to 15% by weight of the composition.

15. The method of claim 1, wherein coating the composition comprises curtain coating, roll coating, gravure coating, jet feed coating, or knife coating.

16. The method of claim 1, further comprising coating a slip layer on a side of the support opposite the dye-donor layer.

17. The method of claim 16, further comprising coating a second subbing layer on the side of the support opposite the dye-donor layer before coating the slip layer.

18. The method of claim 17, wherein the second subbing layer is different from the subbing layer.

* * * * *